United States Patent [19]

Kobayashi

[11] 4,361,339
[45] Nov. 30, 1982

[54] STEERING SKI SUSPENSION FOR SNOWMOBILES

[75] Inventor: Takashi Kobayashi, Hamamatsu, Japan

[73] Assignee: Yamaha Hatsudoki Kabushiki Kaisha, Iwata, Japan

[21] Appl. No.: 160,470

[22] Filed: Jun. 18, 1980

[30] Foreign Application Priority Data

Jun. 27, 1979 [JP] Japan .................................. 54-80241

[51] Int. Cl.³ ........................ B62B 13/08; B62B 17/04
[52] U.S. Cl. .............................. 280/21 R; 267/64.15; 280/25
[58] Field of Search ...................... 280/16, 21 R, 21 A, 280/25, 26; 180/190, 192, 193, 194, 195, 196; 188/269, 314; 267/64 R

[56] References Cited

U.S. PATENT DOCUMENTS 3,854,710 12/1974 Nicholls ............................ 267/64 R
3,877,536 4/1975 Earhart .............................. 180/190
3,931,862 1/1976 Cote .................................. 280/25 X Primary Examiner—John A. Pekar
Attorney, Agent, or Firm—Donald D. Mon

[57] ABSTRACT

A snowmobile includes a frame and a steering ski. A suspension interconnects them so the ski supports and steers the frame. A stationary cylinder is fixed to the frame, and a movable cylinder slides in it. A rod is fixed to the stationary cylinder and carries a head which acts as a restriction to dampen physical shocks. A rod compensation chamber is mounted to the ski and connected to the lower part of the movable cylinder by a flexible conduit. The ski is pivotally mounted to the movable cylinder. A floating piston is slidably fitted in either the rod compensating chamber or in the movable cylinder so that a gas charge can be injected on one side of it, said gas charge occupying all or part of said rod compensating chamber, the other side of said floating piston confronting oil in or from the lower portion of the movable cylinder.

5 Claims, 5 Drawing Figures

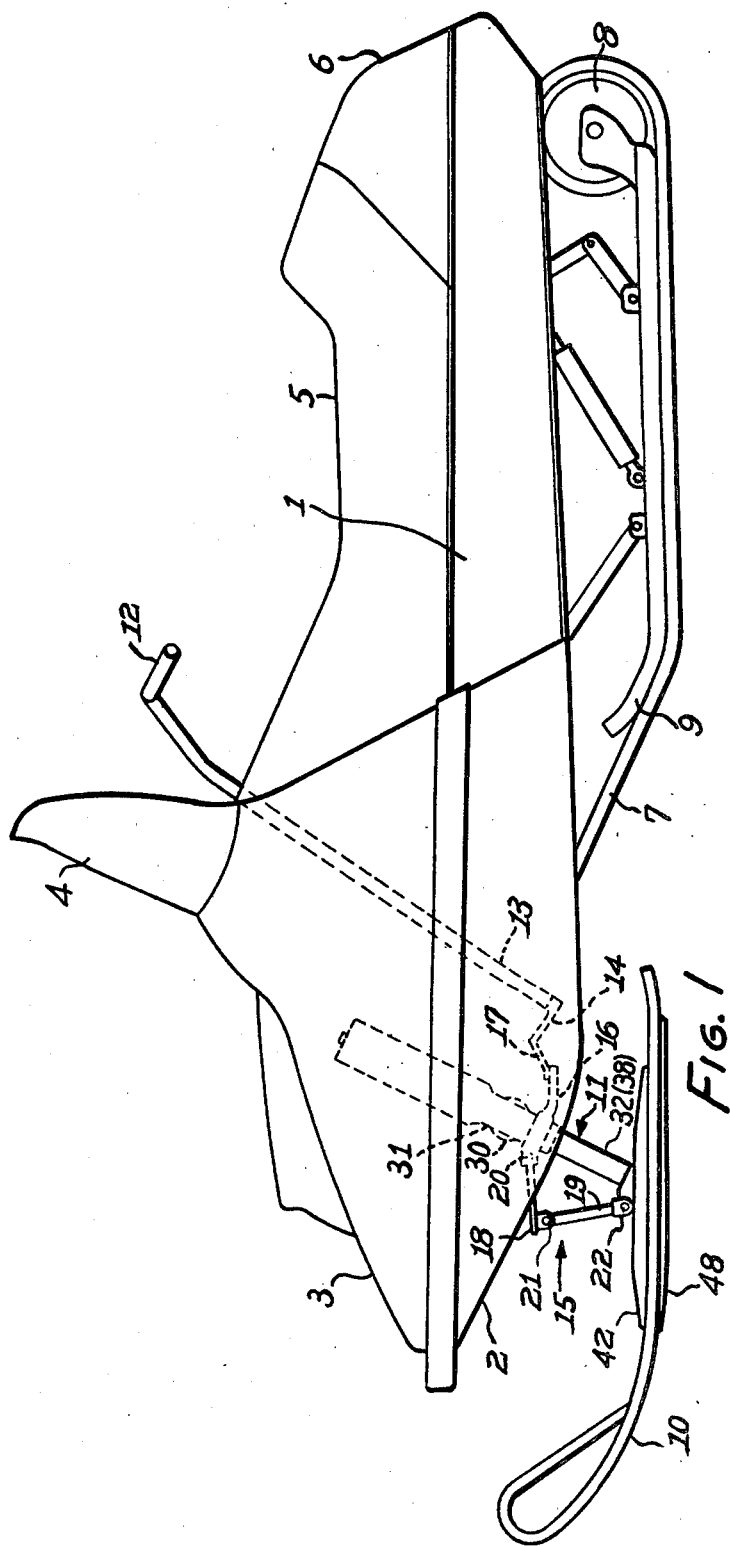
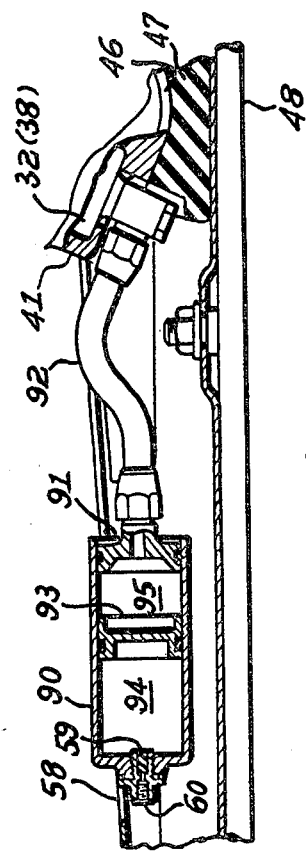
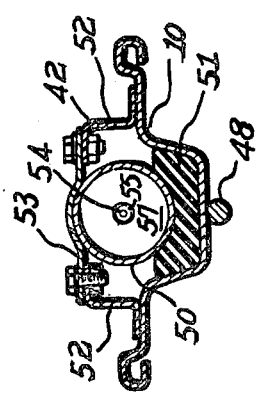

STEERING SKI SUSPENSION FOR SNOWMOBILES

FIELD OF THE INVENTION

The present invention relates to the so-called strut type steering ski suspension system for snowmobiles.

BACKGROUND OF THE INVENTION

In order to improve the power performance of a snowmobile, its drivability and stability must be optimized by improving the running comfortability and grounding characteristics of the steering ski. In order to meet this requirement, there has been proposed in the prior art the so-called strut type steering ski suspension system which is suitable in widening the upward and downward movable range (or cushion stroke) of the steering ski, and which provides excellent turning characteristics. A suspension system of this type is equipped with a stationary cylinder fixed to a frame, a movable cylinder slidably held in the stationary cylinder, and a steering ski attached to the lower end portion of the movable cylinder so that the steering ski is forced into contact with the snow ground through the movable cylinder.

In order to improve the turning characteristics and the running stability, it is sufficient to widen the spacing (or tread) between a right and left steering ski. If, however, the aforementioned strut type suspension system is adopted to enlarge its cushion stroke, its total length in the vertical direction is so enlarged that its upper portion will protrude upward from the chassis, which is conventionally formed into a rounded shape, especially from the engine cowl. Therefore, it is impossible to widen the tread so much. Thus, there has been desired a strut type suspension system which can reduce its vertical length while keeping its cushion stroke as long as possible.

The present invention contemplates to provide a steering ski suspension system for snowmobiles, which is suitable in elongating the cushion stroke while reducing the vertical length. In order to attain this objective a cylindrical shock absorber with a gas chamber is arranged in a movable cylinder such that its cylinder is positioned below, and a rod compensating chamber for compensating the pressure fluctuations in the cylinder of the aforementioned shock absorber due to the entrance and exit of a rod is disposed in the vicinity of the lower end portion of the aforementioned movable cylinder outside of it.

The invention will be fully understood from the following detailed description and the accompanying drawings, in which:

BRIEF DESCRIPTION OF THE DRAWINGS

FIG. 1 is a side elevation showing a snowmobile to which one embodiment of the present invention is applied;

FIG. 3 is a section taken along line 3—3 in FIG. 2; and

FIG. 4 is an axial cross-section of another embodiment of the invention.

DETAILED DESCRIPTION OF THE INVENTION

Figure 2A:
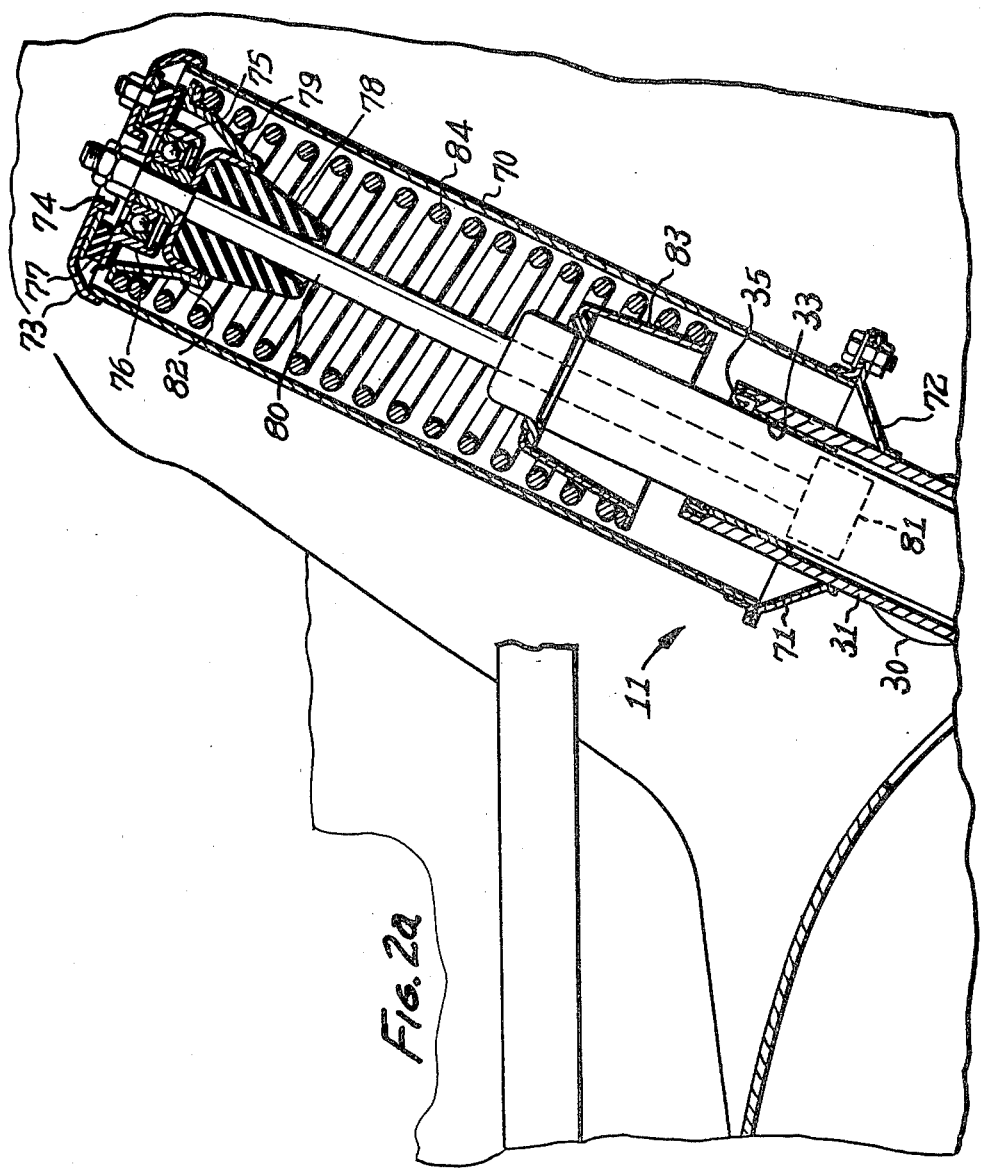
FIGS. 2a and 2b are side elevations showing, in partial section, the steering ski suspension system of the snowmobile, the lower edge of FIG. 2a directly joining the upper edge of FIG. 2b.

In FIG. 1, there is shown a frame 1, a bottom cover 2, an engine cowl 3, a windshield 4, a seat 5 and a rear luggage trunk 6, respectively. A track 7 (of endless type) has its front end made to run on a drive sprocket wheel (not shown) and its rear end made to run on a guide wheel 8. It is elastically urged against the snow by the action of a slide rail type suspension system.

A pair of right and left steering axis 10, and a so-called strut type steering ski suspension system 11 are also shown. A steering bar 12 and a steering column 13 are also included. The rotational motions of steering bar 12 are transmitted to steering ski 10 through both an arm 14 fixed to the lower end of the steering column 13 and a link mechanism 15.

More specifically, an arm 16 is rotatably held on the outer circumference of stationary cylinder 31 of suspension system 11, and will be described in more detail later. The pivotal motions of arm 14 are transmitted to arm 16 by means of a steering tie rod 17. The pivotal motions of the arm 16 are transmitted to the steering ski 10 through links 18 and 19. Incidentally, the connecting pins 20, 21 and 22 between the adjacent pairs of arms 16, links 18 and 19 and steering ski 10 are attached, as is apparent from the drawing such that they are directed sidewise of the chassis when steering skis 10 are in their forward alignment. As a result, the steering link mechanism 15 thus constructed operates to transmit the rotational motions of steering bar 12 to steering ski 10 while permitting upward and downward movements of steering ski 10.

The detailed description of the steering ski suspension system 11 is as follows. A pipe 30 is fixed to frame 1. The aforementioned stationary cylinder 31 is welded to both ends of pipe 30. Stationary cylinder 31 is inclined so that its lower end is positioned in front of its upper end. A movable cylinder 32 is held to extend through the stationary cylinder 31 so that it can move up and down and also rotate. More specifically, movable cylinder 32 is slidably held in two upper and lower plain bearings 33 and 34 which are mounted in stationary cylinder 31. Annular seals 35 and 36 of synthetic rubber are mounted between the upper and lower ends of stationary cylinder 31 and movable cylinder 32, respectively. According to the embodiment being described, movable cylinder 32 constitutes the cylinder 38 of a cylindrical shock absorber 37 with a gas chamber. This shock absorber 37 is formed at a lower portion of the cylinder 38 thereof with a gas chamber 40 which is defined by a free piston 39. This gas chamber 40 is charged with nitrogen gas under pressure, thereby to pressurize the oil in cylinder 38. By pressurizing the oil in this way, aeration of the oil can be prevented, which stabilizes the attenuating characteristics.

Figure 2B:
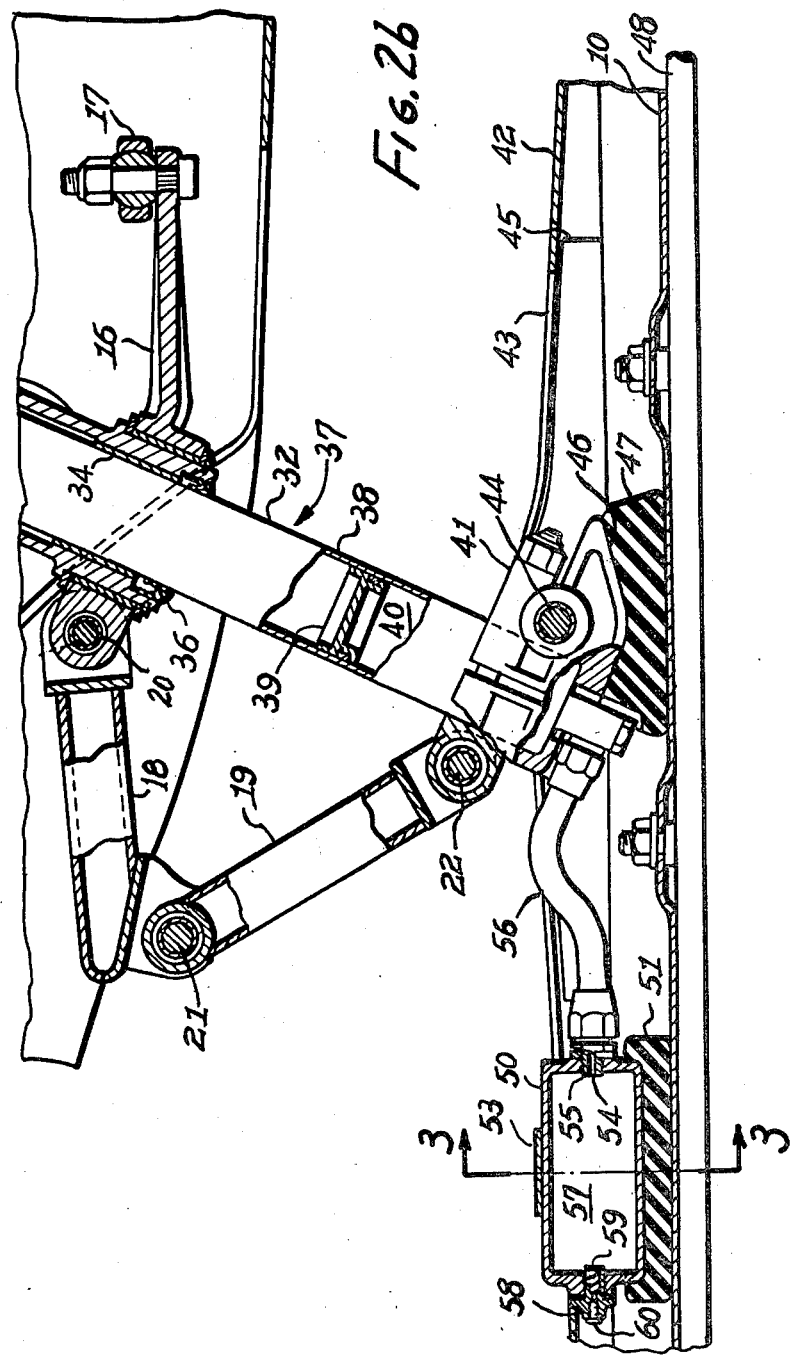

To the lower end portion of the movable cylinder 32, i.e. to the cylinder thereof, there is fixed a bracket 41 to which steering ski 10 is attached. More specifically, a mounting member 42 having a C-shaped section is fixed to the upper sides of the steering ski 10. Bracket 41 is inserted into the opening 43 which is formed in mounting member 42, and steering ski 10 is pivotally attached to bracket 41 by means of a bolt 44 which extends through bracket 41 in a manner to cross the steering ski 10 as well as both side walls of opening 43. Incidentally, reinforcing plates 45 are fixed to the inner sides of those two side walls. On the other hand, bottom side 46 of bracket 41 is curved, as shown in FIG. 2, so that an elastic member 47 is sandwiched between bottom side 46 and the inner sides of steering ski 10. As a result steering ski 10 is urged to return to its horizontal positions by the action of elastic member 47. Incidentally, ski runners 48 are fixed to the sliding sides of the steering ski 10.

A cylindrical gas reservoir 50 is attached to steering ski 10 in the vicinity of the lower end of movable cylinder 32 and in front of bracket 41. Within the opening 43 of the mounting member 42 there is disposed gas reservoir 50 which is clamped between an elastic member 51 sandwiched between the inner sides of the steering ski 10 and the gas reservoir 50, and a holding plate 53 fixed to both side walls 52 and 52 (as shown in FIG. 3) of opening 43.

Into the rear end face of that gas reservoir 50, there is screwed a plug 55 having a communication hole 54, which is communicated with the gas chamber 40 at the lower end of the aforementioned movable cylinder 32 through a communication pipe 56 having flexibility. Gas reservoir 50 is charged up with compressed nitrogen gas in a similar manner to the gas chamber 40. The gas reservoir 50 has its gas chamber 57 acting, together with the gas chamber 40, as a rod compensating chamber for compensating the pressure fluctuations which are established in the cylinder 38 due to the entrance and exit of a later-described rod 80 of the aforementioned shock absorber 37. On the other hand, a plug 58 is screwed into the front end face of gas reservoir 50.

An elastic member 59 is forced from the side of the gas chamber 57 into the through hole which is formed in the plug 58 to provide communication between gas chamber 57 and the atmosphere. A screw 60 is screwed into the through hole from the side of the atmosphere. Plug 58 is used when it is intended to adjust the pressure of the nitrogen gases in the gas chambers 57 and 40. More specifically, gas pressure is adjusted by removing the screw 60 and by inserting the needle of a syringe-shaped pump (not shown) into elastic member 59 through the through hole, thereby to inject or release the nitrogen gas.

A cylinder 70 is fixed to a dish-shaped mounting member 71 to coaxially extend upwardly from the stationary cylinder 31 that is fixed to the upper portion of the aforementioned stationary cylinder 31. Mounting member 71 is formed with a vent hole 72. A cap 73 is fixed to the upper end of the extending cylinder 70. Cap 73 is formed at its center with a round opening 74. To the inner side of cap 73, there is fixed an annular elastic member 77 which in turn is welded to the outer race mounting member 76 of a ball bearing 75. This ball bearing 75 has its inner race fixed to the upper end portion of the rod 80 together with the mounting member 79 of a full bump stopper 78. Rod 80 is positioned on the center axis of cylinder 70 so that it protrudes thereinto from the upper end of the aforementioned movable cylinder 32. To the lower end of the rod 80, there is fixed a piston 81 which is equipped with an orifice (not shown). Piston 81 and rod 80 constitute the aforementioned shock absorber 37 together with cylinder 38, free piston 39, and gas reservoir 50. On the circumferential edge of mounting member 79 of full bump stopper 78, there is retained an upper spring seat 82 having a generally frusto-conical shape, which is formed with flanges at both ends. In the vicinity of the upper end of the aforementioned movable cylinder 32 there is a lower spring seat 83 having a generally frusto-conical shape which is also formed with flanges at both ends. A compression coil spring 84 is mounted between those two spring seats 82 and 83.

Now, in the embodiment thus constructed, if a pushing-up force is applied from the ground (snow surface) to the steering ski 10, the movable cylinder 32, i.e., the cylinder 38 is pushed up so that coil spring 84 is compressed through lower spring seat 83. At this time, since rod 80 and piston 81 are held to allow only the stationary cylinder 31 to rotate through the ball bearing 75, the extending cylinder 70 and so forth, the capacity of the oil chamber below the piston 81 is gradually reduced so that the oil therein is simultaneously fed to the oil chamber above piston 81 through the orifice (not shown) formed in piston 81. Since the oil converts its flow energy into heat when it flows through that orifice, the shock absorber 37 being described accomplishes its attenuating actions.

As cylinder 32 moves upward so that the rod 80 relatively advances thereinto, the capacity of the oil chamber will increase by the capacity of the portion of the rod 80 that advanced. Otherwise, the internal pressure in the oil chamber would be abruptly raised. The fluctuations in the internal pressure of the oil chamber due to the advancement of rod 80 are compensated by the downward movement of the free piston 39 so that they are remarkably reduced in gas chambers 40 and 57. This is because the oil is not compressible whereas the nitrogen gas is compressable.

If, on the contrary, steering ski 10 and movable cylinder 32 are returned downward, the free piston 39 is returned upward so that the respective gas chambers 40 and 57 act to compensate the reduction in the internal pressure of the oil pressure due to the retraction of rod 80.

In the embodiment thus far described, since free piston 39 is disposed in movable cylinder 32, i.e., in cylinder 38 so that only the gas chamber is divided into that at the lower end portion of the cylinder 38 and into the gas reservoir 38, a sufficiently large gas chamber can be prepared so that the fluctuations in the internal pressure of the cylinder can be sufficiently compensated. However, the present invention can be so modified as to have its free piston outside of the cylinder 38. FIG. 4 shows another embodiment for this objective.

An auxiliary cylinder 90 is fixed to steering ski 10. A flexible communication pipe 92 is connected with the rear end plate 91 of the auxiliary cylinder 90. In auxiliary cylinder 90, there is fitted a free piston 93 to define a gas chamber 94 and an oil chamber 95. This oil chamber 95 is communicated with the oil chamber at the lower end portion of cylinder 38 through communication pipe 92.

As a result, the free piston 93 moves within the auxiliary cylinder 90 in accordance with the upward and downward movements of steering ski 10 and movable cylinder 32. More specifically, the inside of auxiliary cylinder 90 acts as the rod compensating chamber for compensating the fluctuations in the internal pressure of the cylinder 33 due to the entrance and exit of the rod 80.

In FIG. 4, the same parts as those of FIGS. 2 and 3 are indicated by the same numerals, and repeated explanations are omitted here.

According to the second embodiment, since a portion of the oil chamber is formed in auxiliary cylinder 90, the movable cylinder can be further shortened to accordingly lower the height of the suspension system to a suitable level.

In the two embodiments thus far described, since the rod compensating chamber is disposed on steering ski 10, its connection with the cylinder can be facilitated more than that if it is disposed at the chassis side. However, the present invention is not to be limited thereto but may be so modified, for instance, that the rod compensating chamber is made integral with bracket 41, or disposed between the outer circumference of the lower end of movable cylinder 32 and the abutting side of bracket 41. In short, it is sufficient that the rod compensating chamber be disposed in the vicinity of the lower end portion of movable cylinder 32.

As has been described, according to the present invention since the cylindrical shock absorber with the gas chamber is disposed in the movable cylinder such that its cylinder is positioned below, and since the rod compensating chamber is disposed in the vicinity of the lower end portion of the movable cylinder outside of the cylinder, either a portion of the gas chamber or portions of the gas chamber and the oil chamber can be made separate from the movable chamber so that this movable chamber can be accordingly shortened. As a result, the vertical length of the suspension system can be reduced. Moreover, it is unnecessary to shorten the cushion stroke. On the other hand, since the rod compensating chamber is disposed adjacent to the lower end portion of the movable cylinder, their piping can be made short and compact even in case they are communicated through the communication pipe. According to the present invention, moreover, since the cooling characteristics of the gas chambers are excellent, the fluctuations in the gas pressure can be reduced in order to reduce the fluctuations both in the height of the snowmobile during the running operation and in the attenuating characteristics of the shock absorber.

This invention is not to be limited by the embodiments shown in the drawings and described in the description which are given by way of example and not of limitation, but only in accordance with the scope of the appended claims.

I claim:

1. A steering ski suspension system for snowmobiles, comprising: a stationary cylinder fixed to a frame; a movable cylinder slidably held in said stationary cylinder; a steering ski attached to the lower end portion of said movable cylinder; a piston rod and piston mounted to said stationary cylinder and movable into and out of said movable cylinder whereby restrictively to pass oil inside said movable cylinder; a rod compensating chamber for compensating the pressure fluctuations in said cylinder of said shock absorber due to the entrance and exit of a rod disposed in the vicinity of the lower end portion of said movable cylinder outside of said cylinder, said rod compensating chamber being adapted to hold gas under pressure; and a floating piston slidably fitted in said rod compensating chamber or in said movable cylinder below said rod separating said oil from said gas.

2. A steering ski suspension system as set forth in claim 1, further characterized: in that said rod compensating chamber is mounted on said steering ski in the vicinity of the lower end portion of said movable cylinder; and in that the inside of said movable cylinder of said shock absorber and said rod compensating chamber are communicated through a communication pipe having flexibility.

3. In a steering ski suspension system for a snowmobile, including a frame and a ski to support and steer the frame, said suspension system including a stationary cylinder fixed to said frame, a movable cylinder axially slidably fitted in said fixed cylinder, a rod fixed to said stationary cylinder and carrying a head disposed in said movable cylinder to form a restricted orifice in said movable cylinder to divide it into two portions for containing oil and acting as a shock absorber by restricting axial transfer of oil across said head, the improvement comprising; a rod compensating chamber mounted to said ski adapted to hold gas under pressure a floating piston separating said oil from said gas and a flexible conduit between and interconnecting said rod compensating chamber and the inside of said movable cylinder closest to said ski, said ski being pivotally mounted to said end of said movable cylinder.

4. Apparatus according to claim 3 in which said floating piston is disposed in said movable cylinder below said rod, and in which gas pressure in said rod compensating chamber is exerted in said movable cylinder below said rod.

5. Apparatus according to claim 3 in which said rod compensating chamber includes a cylindrical portion, and in which said floating piston is axially movable therein, said rod compensating chamber having means for injection of gas under pressure at one side of said piston, said conduit being connected to its other side.

* * * * *